May 15, 1923.

T. F. UHLEMANN 1,455,367

FILM GUIDE FOR MOTION PICTURE MACHINES

Filed June 3, 1920

Inventor,
Theodore F. Uhlemann
By W. B. Morton
his Attorney.

Patented May 15, 1923.

1,455,367

UNITED STATES PATENT OFFICE.

THEODORE F. UHLEMANN, OF NEW YORK, N. Y., ASSIGNOR TO NICHOLAS POWER COMPANY, INC., OF NEW YORK, N. Y., A CORPORATION OF DELAWARE.

FILM GUIDE FOR MOTION-PICTURE MACHINES.

Application filed June 3, 1920. Serial No. 386,145.

*To all whom it may concern:*

Be it known that I, THEODORE F. UHLEMANN, a citizen of the United States and a resident of the city, county, and State of New York, have invented new and useful Improvements in Film Guides for Motion-Picture Machines, of which the following is a specification.

This invention relates to improvements in motion picture machines and has for its object to provide a film guide for a feed sprocket, particularly an intermittent sprocket, which will prevent the film riding off the teeth of the sprocket even though the sprocket holes be worn or mutilated.

I have shown my improved film guide as applied to the intermittent sprocket of the well-known motion picture machine known to the trade as "Power's Cameragraph" and disclosed in United States Patent No. 1,184,126, May 23, 1916, although it will be obvious that the device may be applied to other sprockets of the machine or to any film-feeding sprocket.

Referring to the drawings.

Figure 1:
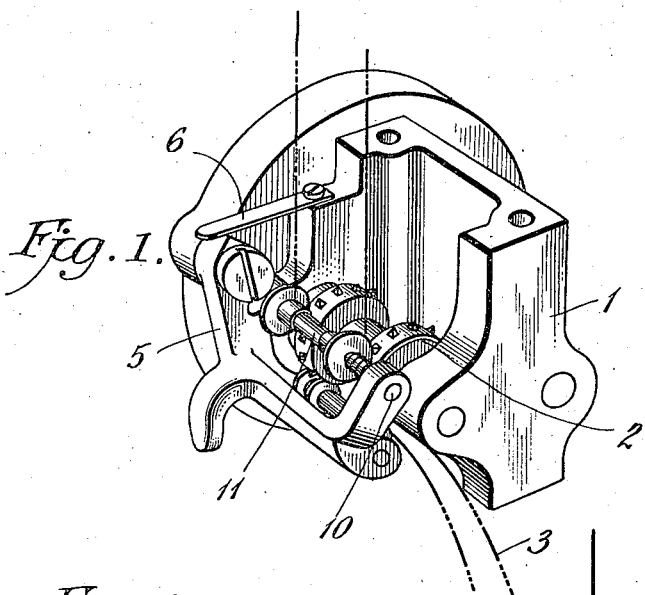
Fig. 1 shows in perspective the portion of said machine known as the framing carriage with my improved film guide supported thereon in conjunction with the intermittent sprocket.

Referring to the drawings, 1 indicates the framing carriage which, as explained in the prior patent above referred to, is mounted for vertical movement beneath the projection aperture of the machine and carries the intermittently operated sprocket 2 for feeding the film past the aperture, the framing carriage being vertically adjustable in order to "frame" the picture into proper registration with the aperture.

Figures 2, 3:
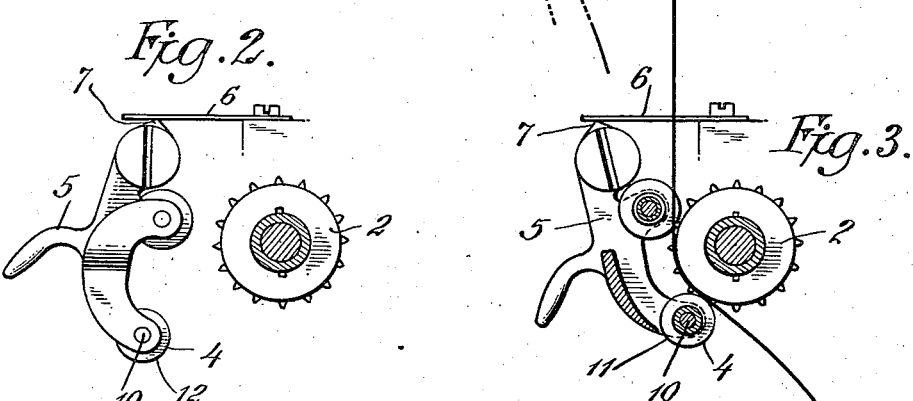
Fig. 2 is a vertical sectional view through the framing carriage and sprocket showing my improved film guide open to receive the film when the machine is to be threaded.
Fig. 3 is a similar view showing the film guide closed against the sprocket.
Figure 4:
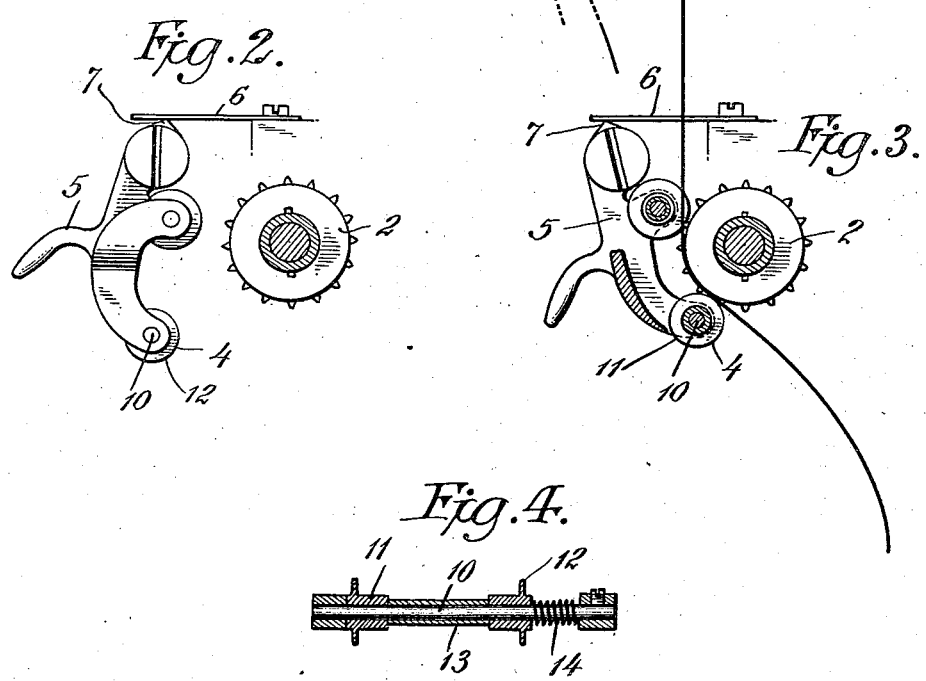
Fig. 4 is a longitudinal sectional view of by improved guide roller.

The film, which is indicated in dotted lines at 3, passes downwardly from the aperture over the sprocket and is held in engagement with the sprocket by a roller 4 carried by a pivoted bracket 5 in position for the roller to be held against the under side of the sprocket when the bracket is in the closed position indicated in Fig. 3. The bracket is provided with a leaf-spring 6 working in conjunction with the cam projection 7 so arranged that the spring will hold the bracket lever in the open position of Fig. 2 or the closed position of Fig. 3.

The roller 4 is provided at each end with grooved flanges which engage the margins of the film on each side of the teeth of the sprocket to hold the film on the sprocket teeth. The mechanism above described is old and well-known and the structure disclosed is substantially the same as that shown in the above mentioned patent.

If all parts of the machine are properly adjustable and the film is in good condition, the above described roller is sufficient of itself to hold the film in engagement with the sprocket. I have found, however, that in the normal operation of the machine the film will pull unevenly at the aperture, due to uneven tension on the shoes at the margins of the film or to sticking of the film at one side or the other, or for various other reasons, causing the film to shift laterally so that the teeth of the intermittent sprocket where they enter the sprocket holes do not exactly register with the sprocket holes, thereby causing the holes to be unduly worn or the film to ride up on the sprocket teeth. To prevent this operation I have provided the bracket 5 with an edge-guiding device to engage the edges of the film at the point where the teeth of the sprocket enter the holes in the film, the guiding device acting to maintain the film in proper parallelism with the flanges of the sprocket so that the teeth register properly with the holes.

My improved edge-guiding device comprises a rod 10 supported in ears at the edges of the bracket at the position shown. Supported on the rod at the inner edge of the bracket is a flanged roller 11 adapted to engage the margin of the film with its periphery and the edge of the film with its flange. A second flanged roller 12 is mounted on the rod 10 and pressed toward the roller 11 by means of a light spring 14 between the hub of the roller and the ear of the bracket. The two flanged rollers are separated by a sleeve 13 supported on the bracket and of a length to maintain the flanges separated by a distance equal to the width of standard film.

The operation of the device is as follows.

In the normal operation of the machine the edges of the film will be but lightly engaged by the flanges of the rollers, and as the rollers are free to turn on their rod they will add but little friction to the passage of the film through the machine and will be but very little worn by the engagement of the passing edge of the film. Should, however, the film tend to pull sidewise, it will be resisted by the flange of one of the other rollers, the spring 14 being of sufficient strength to hold the roller 12 against the tendency to lateral movement of the film. Should an imperfect splice or an unduly wide portion of the film reach the sprocket the spring 14 permits the flange rollers to separate for the passage of the obstruction without damage to the film.

My improved film guide has been described in detail as it is at present applied to the above mentioned type of machine. It will be understood, however, that the guide may be applied with advantage to any film-feeding sprocket, particularly the intermittent sprocket, and that the details of construction may be variously modified without departing from the invention.

I claim:

1. In a motion picture apparatus, the combination of a film-feeding sprocket below the projector aperture and a pair of freely rotatable disks supported in position to engage the edges of the film at the point where the sprocket teeth enter the holes in the film, said disks being spaced apart a distance equal to the width of the film and yieldingly held against lateral displacement to maintain the sprocket holes in alinement with the path of movement of the sprocket teeth.

2. In a motion picture apparatus the combination of a film-feeding sprocket below the projector aperture, a bracket mounted for adjustment toward and from said sprocket, a pair of freely rotatable disks carried by said bracket for engaging the edges of the film, a separator between said disks for maintaining them separated a distance at least equal to the width of the film, a spring for pressing said disks toward each other and adapted to yield to permit a separation of the disks for the passage of an abnormal width of film.

3. In a motion picture apparatus, the combination of a film-feeding sprocket below the projector aperture, a pair of freely rotatable members adjacent the sprocket, for engaging the sides of the film, and means for holding said guides spaced apart a distance equal to the width of the film, said means yielding to permit the passage of an imperfect splice or abnormal width of film but resisting lateral thrust due to sidewise pulling of the moving film.

4. In a motion picture apparatus, the combination of a sprocket, guide means adjacent said sprocket for engaging the sides of the film, said means yielding to the pressure of an abnormal width of film but resisting lateral thrust due to sidewise pulling of the film.

Signed at New York, in the county of New York, and State of New York, this 23rd day of December 1919.

THEODORE F. UHLEMANN.